United States Patent [19]

Dartey et al.

[11] Patent Number: 4,668,519
[45] Date of Patent: May 26, 1987

[54] REDUCED CALORIE BAKED GOODS AND METHODS FOR PRODUCING SAME

[75] Inventors: Clemence K. Dartey, Oakland; Richard H. Biggs, Patterson, both of N.J.

[73] Assignee: Nabisco Brands, Parsippany, N.J.

[21] Appl. No.: 589,588

[22] Filed: Mar. 14, 1984

[51] Int. Cl.$^4$ .................... A23L 1/236; A21D 10/00; A21D 13/08
[52] U.S. Cl. .................... 426/548; 426/553; 426/658; 426/804
[58] Field of Search .................... 426/549, 551–555, 426/653, 658, 548, 804

[56] References Cited

U.S. PATENT DOCUMENTS

| | | | |
|---|---|---|---|
| 3,676,150 | 7/1972 | Glicksman et al. | 99/90 R |
| 3,766,165 | 10/1973 | Rennhard | 260/209 R |
| 3,876,794 | 4/1975 | Rennhard | 426/548 |
| 4,042,714 | 8/1977 | Torres | 426/62 |
| 4,100,503 | 4/1981 | Taylor et al. | 426/549 |
| 4,219,580 | 8/1980 | Torres | 426/549 |
| 4,304,768 | 12/1981 | Staub et al. | 424/180 |
| 4,344,969 | 8/1982 | Younquist | 426/18 |
| 4,351,852 | 9/1982 | Rule et al. | 426/554 |
| 4,360,534 | 11/1982 | Brabbs et al. | 426/560 |
| 4,371,561 | 2/1983 | Forsythe | 426/653 |
| 4,444,799 | 4/1984 | Vanderveer et al. | 426/549 |
| 4,455,333 | 6/1984 | Hong et al. | 426/94 |
| 4,456,625 | 6/1984 | Durst | 426/106 |
| 4,503,080 | 3/1985 | Brabbs et al. | 426/94 |
| 4,511,318 | 4/1985 | Kolodesh | 426/94 |
| 4,511,585 | 4/1985 | Durst | 426/106 |
| 4,528,900 | 8/1985 | Simelunas | 99/450.7 |
| 4,534,726 | 8/1985 | Simelunas | 425/363 |
| 4,622,233 | 11/1986 | Torres | 426/548 |

FOREIGN PATENT DOCUMENTS

| | | |
|---|---|---|
| 1016006 | 3/1977 | Canada. |
| 31718 | 7/1981 | European Pat. Off.. |
| 0086527 | 8/1983 | European Pat. Off.. |
| 1418544 | 12/1975 | United Kingdom. |

OTHER PUBLICATIONS

H. M. Reiman, *Chemical Leavening Systems*, Bakers Digest, Jul./Aug. 1983, pp. 37–40.

K. D. Brys, *Microcrystalline Cellulose Replacement in Cakes and Biscuits*, Journal of the American Dietetic Association, 50–55 (Jul. 1976).

P. E. Hutchinson, *Effect of Emulsifiers on the Texture of Cookies*, Journal of Food Science, vol. 42, No. 2 (1977).

C. C. Tsen, The Shortening-Sparing Effect of Sodium Stearoly-2 Lactylate and Calcium Stearoyl-2 Lactylate in Bread Baking, reprinted from the Jun. 1971 issue of Bakers Digest, vol. 45, No. 3, pp. 38–40, 42.

J. J. Beereboom, *Low Calorie Bulking Agents*, CRC Critical Reviews in Food Science and Nutrition, May 1979.

W. C. Griffin, *Emulsions*, Encyclopedia of Chemical Technology, vol. 8, 2nd Ed., John Wiley & Sons, Inc. pp. 900–930 (1965).

Matz, Snack Food Technology, Avi Pub. Co. Inc. 1976, Westport, Conn., pp. 160–169.

*Primary Examiner*—Robert Yoncoskie
*Assistant Examiner*—Marianne M. Cintins
*Attorney, Agent, or Firm*—Richard Kornutik

[57] ABSTRACT

Reduced calorie cookies having a pH of from about 6.8 to about 9.0 are disclosed which exhibit the desirable texture, mouth-feel and appearance of conventional cookies. An alkaline agent and a leavening system which is predominantly active during baking are used to control pH and textures of the cookies. The cookie contains as a preferred cellulosic bulking agent microcrystalline cellulose. An aqueous solution of the water-soluble polydextrose is used as a replacement for shortening or fat and sugar to avoid lump formation. Powdered or insoluble polydextroses or polymaltoses are incorporated into the dough in the dough forming stage rather than in the creaming stage to enhance crispiness and achieve further caloric reductions.

45 Claims, No Drawings

REDUCED CALORIE BAKED GOODS AND METHODS FOR PRODUCING SAME

FIELD OF THE INVENTION

This invention relates to cookie doughs for producing reduced calorie cookies. This invention also relates to reduced calorie cookies and to methods for the production of reduced calorie cookies.

BACKGROUND OF THE INVENTION

The ready availability of a variety of highly flavorful food products coupled with the relatively sedentary lifestyles of a good segment of the population has given rise to excess accumulation of calories in most citizens. Estimates indicate that about 40% of the U.S. population may be overnight. J. J. Beereboom, CRC *Critical Reviews in Food Science and Nutrition*, pps. 401–413, May 1979. Consequently, an increasing number of consumers are practicing some form of dieting and monitoring of caloric intake. This is evidenced by the rapid growth and successful introductions of a variety of reduced calorie products, such as cake mixes, beers, wines, pizzas, candies, sodas, margarines and cookies, etc., into the food market.

Flour, sugar, fats or shortening, and in some cases emulsifiers, contribute a majority of the calories to most cookies and sweet goods. It is known that portions of these components can be replaced with lower calorie components which perform at least some of the same functions. However, even when a functional equivalent is found, it often adversely affects other physical or chemical properties of the dough and/or baked product.

Emulsifiers, fats and shortenings are functionally active in baked goods. As well known, the primary functions of these products include structural support, tenderization, freshness preservation, lubrication and aeration of doughs, control of fat crystal growth or development and modification of dough consistency through reaction with wheat proteins (gluten).

Emulsifiers are surfactants or surface-active agents. Apart from their definitional interface action as stabilizing agents for emulsions, foams and suspensions, they also play an important role as texture modifiers through their interaction with polymers, such as, starch and protein and by their modification of lipid crystallization.

A shortening is a plastic fat, and by definition, is a mixture of triglycerides having widely differing melting points. Fat crystals in a shortening are held together by internal cohesive forces and liquid oil is enmeshed in the structure. The performance of a fat or shortening in a baked product depends on its physical properties. These properties include ratio of solids to liquids (solid fat index) over a wide range of temperatures, size and shape of the crystals, and the nature of polymorphism in the fat crystals.

The two most common types of emulsion systems encountered in foods are oil-in-water and water-in-oil emulsions. An emulsion is a macro-disperse system, a two-phase system of two incompletely miscible liquids, one being dispersed as finite globules in the other. The dispersed, discontinuous, or internal phase is the liquid that is broken up into globules. The surrounding liquid is the continuous or external phase. In an oil-in-water (O/W) emulsion system, water forms the continuous phase. Similarly in a water-in-oil (W/O) emulsion system, the oil forms the external or continuous phase.

The Hydrophile-Lipophile-Balance (hereinafter referred to as HLB) system is the systematic approach used in selection of emulsifiers. See *Emulsions, W. C. Griffin, Encyclopedia of Chemical Technology*, Vol. 8, 2nd Edition, John Wiley and Sons Inc., pps. 117–154, (1965) and W. C. Griffin, J. Soc. Cosmet. Chem., 1:311, 1949. This is based on the recognition that each emulsifier is amphiphilic in nature, that is, each emulsifier possesses both hydrophilic and lipophilic groups in the same molecule.

Emulsifiers have been assigned HLB values from 0–20. Those emulsifiers with HLB values less than 9 are lipophilic while those with HLB values above 11 are hydrophilic. Emulsifiers with HLB values of 9–11 have equal affinity for water and oil. A multi-component emulsifier system with the same HLB value as a single emulsifier is known to render greater emulsion stability than an emulsion system composed of only a single emulsifier. O. K. Chung and Y. Pomeranz, *ISF/AOCS World Congress*, NY, April 1980.

The weight percentages of shortenings and emulsifiers used in most baked products are low. However, shortenings and most emulsifiers have high caloric values. Consequently, only limited amounts of shortenings and/or emulsifiers can be used in the formulations for reduced or low calorie type baked products. The amounts of sugar and flour in these types of products must also be reduced through the use of suitable reduced calorie sweeteners and bulking agents.

Shortening-sparing effects of sodium stearoyl-2-lactylate (SSL) and calcium stearoyl-2-lactylate (CSL) were studied in regular white bread and high protein bread. See Tsen et al, *Baker's Digest* Vol. 45 No. 3, pp. 38–40, and 42 (1971). Sodium stearoyl-2-lactylate or SSL, added to a sponge at 0.25% to 0.5%, effectively replaced the normal 3.0% textured lard required in white bread or high protein (12% soy flour) bread. Sodium stearoyl-2-lactylate, 0.5%, reportedly, produced an acceptable high protein bread superior in loaf volume and score to the control high protein bread with 3% shortening.

Hutchinson et al., *J. Food Sci.* Vol. 42 No. 2, p. 399 (1977), also studied and determined the shortening-sparing effects of various levels of emulsifiers including SSL, lactylic acid esters of fatty acids (LAEFA), ethoxylated monoglycerides (EMG) and diglycerides (EDG), polyglycerol esters (PGE) and diacetyl tartaric acid esters (DATA). They found that in order to maintain proper balance in the formulas of reduced shortening cookies, it was necessary to increase the water in the recipes by one-half the weight of shortening removed.

In U.S. Pat. No. 4,351,852 the caloric content of cake batters or mixes is reduced by replacement of the normal fat content with a partial glycerol ester emulsifier, the major constituent of which is diglyceride, present in an amount of about 38 to 48%. The partial glyceride ester emulsifier is used in an effective amount so as to obtain improved cake volume, grain and texture. The preferred amount of emulsifiers is about 10 to 25%, based on the weight of the flour employed. A conventional cake formulation as disclosed may employ about 40 to 60% by weight of a fluid shortening, based upon the weight of the flour. Additional lipids or fat, or other emulsifiers, it is taught, can be used in combination with the partial glyceride ester emulsifier to obtain various properties. However, use of this emulsifier with a flour substitute to achieve further caloric reductions is not disclosed.

Improved emulsifiers for use in the preparation of baked goods are disclosed in U.S. Pat. No. 4,371,561 and in U.S. Defensive Publication T100,503. According to U.S. Pat. No. 4,371,561, the thermal mixing of hydrogenated stearin with stearoyl lactylate salts advantageously increases the melting and softening points and reduces the hygroscopicity of such salts. In the Defensive Publication, liquid emulsifiers for bread are prepared by blending diacetal tartaric acid esters of unsaturated vegetable oil or animal fats, monoglycerides, unsaturated vegetable oil and propylene glycol monoester of unsaturated vegetable oil or animal fat. The use of these liquid emulsifiers in the preparation of bread, it is disclosed, imparts excellent physical characteristics to the bread. However, neither of these references disclose the use of these emulsifiers to obtain caloric reduction in baked goods.

In addition to fats, the other principal sources of calories in most baked products are flour and sugar. The protein content of most baked products is low. Consequently, any considerations for reduction in calories of these products must involve reductions in the metabolizable carbohydrates and/or fats and oils.

Fructose is potentially sweeter than sucrose. Consequently, there is a theoretical advantage to using less fructose to provide an equivalent degree of sweetness in baked products which normally contain sucrose. Fructose has an agreeable sweetness with no bitter aftertaste and is claimed to be 15-80% sweeter than sucrose. See, Schallenberger, R. S., *J. Food Sci.*, No. 28, pp. 584-589 (1963). However, the relative sweetness of fructose depends on its physical state as indicated by Doty et al in *Food Technol.*, No. 29, pp. 34-38 (1975). It is sweeter when cold, at neutral or slightly acidic pH, or in dilute solution. Fructose is known to aid moisture retention in baked goods, but reportedly does no provide the texture, consistency or color that would encourage its widespread use in baked goods. See *Alternative Sweeteners,* The Caloric Control Council, Atlanta, Ga., 30342, page 6, June 3, 1980.

As indicated in U.S. Pat. Nos. 4,137,336, 4,185,127, and 4,379,174, all to Radlove, the use of fructose as a replacement for sucrose to reduce calories in baked goods has met with little success because fructose loses much of its sweetness upon heating of the batter. In U.S. Pat. No. 4,137,336, a dietetic cookie mix is disclosed wherein torula yeast, stearoyl monoglyceridyl citrates and propylene glycol monostearate are used to enable the fructose to retain a sufficient degree of sweetness while it is heating during the cookie baking process. In the dietetic cake mix of U.S. Pat. No. 4,185,127, crystalline fructose is combined with baking powder having glucono-delta lactone as the acidic component and emulsifiers such as propylene glycol monostearate and lactated monoglycerides to obtain a product which has an acceptably sweet taste upon baking. In U.S. Pat. No. 4,379,174 high fructose corn syrup is used to replace the expensive crystalline fructose which is utilized in U.S. Pat. No. 4,185,127. Calorie reduction by replacing flour or shortening is not taught to the Radlove patents.

When the levels of sugar and/or flour are reduced to achieve reductions in the calories of baked products, suitable bulking agents or non-metabolizable forms of carbohydrates must be used to balance the formulas of these baked products. Two types of bulking agents are required: (1) a soluble material that can replace the sucrose and other simple carbohydrates in food and (2) an insoluble material capable of replacing the lost flour or starch in the formulations. The rheological properties of the flour and starch must be attained to successfully replace the flour and starch. A number of commercially available products, natural and synthetic, have been used as bulking agents for fats and carbohydrates in various reduced calorie baked products as disclosed in Beereboom, *CRC Critical Reviews in Food Science and Nutrition,* pps. 401-413 (May 1979), Brys, J. Amer. Dietetic Assoc., Vol. 69 No. 6, pp. 50-55 (1976) and U.S. Pat. No. 3,876,794. These products include cellulose, microcrystalline cellulose, xanthan gum, polydextrose, polyglycerol esters, polyoxyethylene fatty acid esters and sucrose polyester.

However, as reported by Beereboom, supra, foods which contain appreciable quantities of cellulose exhibit poor palatability. Accordingly, the use of cellulose products in foods has been at relatively low levels for texture improvement.

In U.S. Pat. No. 4,219,580 it is taught that the cellulosic flour substitutes, such as crystalline alphacellulose sold under the tradename "Solka-Floc", and the microcrystalline cellulose sold under the tradename "Avicel", can only be used up to a replacement level of about 20% which leads to a caloric reduction in the final baked goods of only about 10%. The taste and texture of baked goods obtained using replacement levels greater than about 20%, it is disclosed, are unsatisfactory.

It has been found that generally gums and/or gels perform poorly, even at low levels of less than 0.5% by weight. Typically, cookies which contain gums and/or gels are gummy and do not spread during baking. Humectant gels, however, have been found to improve spreading and textural characteristics of cookies at levels up to about 10%. In U.S. Pat. No. 3,676,150, low calorie, yeast leavened baked goods, including bread, are prepared from a flour which is a combination of starch, cellulose gums, and alpha-cellulose. According to U.S. Pat. No. 3,676,150, the starch and cellulose gums apparently react with the surface moisture of the alpha-cellulose and with the alpha-cellulose per se to form a flour which has the same film forming characteristics as that of gluten-containing wheat flour. However, the gluten-free flour of U.S. Pat. No. 3,676,150 contains, on a weight basis, from about 30% to about 70% alpha-cellulose. Use of this flour in the production of baked goods in substantial amounts would detract from palatability of the product due to the large amounts of alpha-cellulose.

In Eurpean Patent Publication No. 0086527, published Aug. 24, 1983, it is taught that when a liquid polyol polyester is used to replace a substantial part of the triglycerides in a baked goods composition, up to 100% of the flour or starch in the composition may be replaced with microcrystalline cellulose without causing the expected undesirable side effects of cellulose in food products such as poor texture, and dry, sandy or gritty mouthfeel. The baked products comprise from about 12% to about 60% of a non-absorbable, non-digestible liquid polyol fatty acid polyester, from about 10% to about 50% by weight of the polyester of an anti-anal leakage agent, and from about 25% to about 85% of either microcrystalline cellulose and flour in a weight ratio of at least 1:1. The anti-anal leakage agent, it is taught, prevents frank leakage of the liquid polyesters through the anal sphincter.

According to U.S. Pat. No. 4,304,768 dietary fiber preparations are incorporated into polysaccharide and/or polyol-containing foodstuffs at a level sufficient to exhibit an anti-diarrheal effect. The polysaccharide materials may be of the soluble or insoluble type taught in U.S. Pat. No. 3,766,165. Alpha-cellulose is disclosed as a dietary fiber preparation which exhibits an anti-diarrheal effect.

Dietary fibers, such as wheat and corn brans, and soy filtrate, a soybean by-product, have relatively low calorie contents of 2.13 calories/gram, 0.1 calorie/gram, and 1.0 calorie/gram, respectively. However, as reported by Beereboom, supra, dietary fibers frequently cause significant textural problems in baked goods. Only modest caloric reductions in the foods are possible while some palatability problems remain.

Polydextrose, as reported in Beereboom, supra, can provide the bulk and texture normally attained from sucrose. It is reported that polydextrose can also function as a partial replacement for fat, flour, or starch in some applications. Its use in foods to reduce calorific values is desirable because its calorific value is only one calorie per gram.

In U.S. Pat. Nos. 3,766,165 and 3,876,794, Great Britain Pat. No. 1,418,544, and Canadian Pat. No. 1,016,006 each to Rennhard, the production of polyglucoses or polydextroses, and polymaltoses is disclosed. The polymers are produced directly from glucose and maltose by a process of anhydrous melt polymerization using edible acids as catalysts and as cross-linking agents. By controlling the amount of acid, either a water soluble or water insoluble polymer or both forms can be produced. As the amount of acid is increased, the degree of acid cross-linking increases and the proportion of water-insoluble polyglucose or polymaltose increases.

The soluble polyglucoses and polymaltoses, it is disclosed, are useful for imparting the physical properties of natural foods, other than sweetness, to dietetic foods of which the natural sugars have been removed and have been replaced by artificial or other sweeteners. The soluble forms of polyglucose and polymaltose are not sweet. According to Rennhard, the soluble polyglucoses or polymaltoses affect rheology and texture of baked goods in a manner analogous to sugar and can replace it as a bulking agent. In U.S. Pat. No. 3,876,794 Rennhard also teaches that the polyglucoses allow the elimination of 20 to 100% of the normal fat, oil or fatty triglycerides components of the food, depending upon the type of food. The insoluble polyglucoses, it is taught, are useful as flour substitutes in cakes, cookies, breads, pastries, and other baked products involving flour derived from wheat, corn, rice, and the like.

According to U.S. Pat. No. 3,876,794, Great Britian Pat. No. 1,418,544 and Canadian Pat. No. 1,016,006 in leavened baked foods such as cakes, cookies, and cupcakes, each part by weight of the fatty triglyceride and carbohydrate normally present in the product is replaced by from about 0.25 to 1.5 parts by weight of modified polyglucose. The modified polyglucoses include citrated and tartrated polyglucose in neutralized or acid forms, the preferred forms being citrated polyglucose with sorbitol, in neutral and acid form. The latter forms contain about 5% to about 20% by weight of sorbitol chemically bonded to the polyglucose.

Production of a dietetic cookie is disclosed in Example XLVI of U.S. Pat. No. 3,876,794 and in Example XV of Great Britian Pat. No. 1,418,544 and Canadian Pat. No. 1,016,006. The modified polygluclose powder, non-fat milk solids and emulsified shortening are creamed, eggs are added, and mixing is continued. Water, containing dissolved saccharine and flavor are then added to the mixture. Flour, sodium bicarbonate, glucono-delta lactone and micro-crystalline cellulose are then added and mixing is continued, followed by baking at 375° F. for 15 to 20 minutes. The modified polydextrose is about 26% by weight, the flour is about 24% by weight, the shortening is about 17% by weight, and the microcrystalline cellulose is about 8% by weight of the cookie dough. However, saccharine but no sugar is used in the cookie dough formulation which results in a final product of inferior taste and texture. Additionally, incorporation of the modified polydextrose powder in the creaming stage results in lump development and a sticky dough which requires an undesirably long laytime for commercial scale wire cut production methods.

U.S. Pat. No. 4,042,714 discloses a low-calorie farinaceous composition comprising from about 20 to 75% by weight of modified polydextrose, from about 2 to 20% by weight of proteinaceous material, from about 10 to 40% by weight of cellulose derivatives selected from alphacellulose and microcrystalline cellulose, and from about 5% to 20% by weight of flour. The polydextrose is a water-soluble highly branched polydextrose containing from about 0.5 to 5 mol percent of polycarboxylic acid ester group selected from the group consisting of citric, fumaric, tartaric, succinic, adipic, idiconic and malic acids. The polydextrose also contains from about 5 to 20% by weight of a food-acceptable polyol. According to U.S. Pat. No. 4,042,714, the water soluble forms of modified polydextrose disclosed in U.S. Pat. No. 3,876,794 and in U.S. Pat. No. 3,766,165, function as a replacement for sucrose in many foods. However because of their solubility, they cannot function as flour replacements. The compositions of U.S. Pat. No. 4,042,714, it is taught, can serve as a replacement for at least 50% of the wheat flour used in food compositions such as pastas, pancakes, and leavened backed foods.

The flour substitutes of U.S. Pat. No. 4,219,580 comprise either cellulose or a non-digestible, acid treated starch derivative or a mixture thereof together with a minor amount of xanthan gum and a minor amount of an emulsifier agent. The preferred emulsifiers are lecithin, mono-diglyceride mixture, sodium stearoyl-2-lactylate and triglycerolmonostearate. The flour substitute of U.S. Pat. No. 4,219,580 is used at levels as high as 70% replacement of the flour component so as to achieve a maximum of about 30% to 35% fewer calories per unit weight than conventional baked goods.

The flour substitute, it is disclosed, can be used in the preparation of baked goods in which some or all of the sugar component has been replaced by a lower calorie substitute, such as the modified polydextroses described in U.S. Pat. No. 3,766,165. In the chocolate flavored cookie formulation of Example X and in the vanilla flavored cookie formulation of Example XIV of U.S. Pat. No. 4,219,580, 100% and 25% of the sugar, respectively is replaced by modified polydextrose. The use of the modified polydextrose as a shortening substitute to enable the retention of sugar for its advantageous effects on texture and taste is not disclosed. Additionally, the use of a multicomponent leavening system which is predominantly active during baking and the use of an alkaline agent for pH control of the final product to achieve a tender open cell structure in cookies which contain modified polydextrose is not taught or suggested.

The present invention provides a process for the preparation of reduced calorie baked goods which possess the desirable texture, mouthfeel, and appearance of conventional baked goods by partially replacing the flour, shortening or fat, and sugar with emulsifiers, polydextroses or polymaltoses and cellulosic bulking agents. The baked goods are intended to have texture, sweetness, appearance, flavor and mouthfeel which appeal to the general consumer and not just dedicated dieters or persons whose dietary intakes are restricted medically for reasons such as diabetes and excessive obeseness. Caloric reductions of at least 25%, based upon conventional formulations, are achieved with minimal replacement of the sugar component. A tender open cell structure is achieved by controlling the pH of the final baked product with an alkaline agent and by use of a multicomponent leavening system. Lump formation in the creaming stage which is normally encountered in the use of polydextroses in dry or powdered form is avoided by: (a) mixing the polydextrose in dry form with the dry ingredients (e.g., flour), rather than creaming it as a sugar in conventional cookie production and (b) using an aqueous solution of a soluble polydextrose in the creaming stage.

SUMMARY OF THE INVENTION

The present invention relates to cookie doughs and methods for producing reduced calorie cookies which possess the desirable texture, mouthfeel and appearance of conventional cookies. Reductions in the sugar, flour and shortening contents of the baked goods are compensated with lower calorie ingredients including a water-soluble polydextrose, an emulsifier and a cellulosic bulking agent.

Tender open-celled structures are achieved by controlling the pH of the final baked product to be within the range of about 6.8 to about 9.0. An alkaline agent and a leavening system which is predominantly active during baking are used to control pH and textures. Greater replacement of shortening and flour, particularly greater replacement of shortening so as to retain higher levels of sugar for its sweetness and its beneficial effects on texture and oven spread is preferred.

The cookie doughs of the present invention comprise (a) from about 10% to about 30%, preferably from about 18% to about 24% flour, (b) from about 0% to about 15%, preferably from about 6% to about 12% shortening or fat, (c) from about 5% to about 20%, preferably from about 12% to about 16% of at least one sugar, (d) from about 5% to about 20%, preferably from about 8% to about 12% of a water-soluble polydextrose, (e) from about 0% to about 10%, preferably from about 0.25% to about 3% of at least one emulsifier, (f) from about 0.50% to about 3%, preferably from about 1% to about 2.5% of a leavening system, said leavening system comprising (1) at least one bicarbonate and/or carbonate, and (2) at least one acidifier which releases at least about 50% of the leavening gas during baking, and (g) from about 4% to about 15%, preferably from about 6% to about 11% of a cellulosic bulking agent, said percentages being based upon the weight of the cookie dough, the total amount of said shortening or fat (b) and said at least one emulsifier (e) being from about 6% by weight to about 15% by weight of said cookie dough. The preferred cellulosic bulking agent is microcrystalline cellulose.

Employment of an aqueous solution of the water-soluble polydextrose as a replacement for shortening or fat and sugar avoids lump formation. Powdered or insoluble polydextroses or polymaltoses are incorporated into the dough in the dough forming stage rather than in the creaming stage to enhance crispiness and achieve further caloric reductions without lumping.

DETAILED DESCRIPTION OF THE INVENTION

Reduced calorie baked goods with a calorie reduction of at least 25%, more preferably a calorie reduction of at least one-third is achieved by lowering the sugar, flour and shortening contents of the baked goods. Reductions in these components are compensated with calorie ingredients including a water-soluble polydextrose, an emulsifier, and a cellulosic bulking agent. A multi-component leavening system and an edible alkaline agent are used to provide a pleasing open-celled texture in the final baked products.

As used herein, the terms "reduced calorie cookies", "reduced calorie baked goods", and the like refer to a calorie reduction of at least 25% compared to a conventional formulation of the same type. Thus, reduced calorie chocolate chip cookies and sugar cookies have reduced calories compared to conventional chocolate chip cookies and conventional sugar cookies, respectively. Generally, reduced calorie cookies produced from cookie doughs of the present invention have a calorie content of about 3 to 4 calories per gram.

In the present invention a water-soluble polydextrose, which is normally used as a replacement for sugar or fats in baked goods, is used primarily as a replacement for fats or shortening. This permits retention of sugar for sweetness and its beneficial effects upon texture and oven spread.

The water-soluble polydextrose is preferably added as an aqueous solution. The use of polydextrose in dry or powdered form in a creaming stage as a sugar or shortening replacement tends to result in lump formation which result in undesirable gummy local concentrations of the material in the baked product. Lumping can be reduced by slowly adding the powder in the creaming stage with high speed mixing. However, the slow addition hinders commercial scale operations. High shear mixing and alkaline conditions can be used to solubilize the dry or powdered polydextroses for incorporation into the reduced calorie cookie dough composition at the creaming stage. However, additional processing steps and equipment would be needed.

Water-soluble polydextroses which can be used in the present invention are disclosed in U.S. Pat. Nos. 3,766,165 and 3,876,794. As disclosed in these patents, the water-soluble polydextroses are highly branched and the linkage of 1-6 predominates. Additionally, they have a number average molecular weight between about 1,500 and 18,000 and contain from about 0.5 to 5 mole percent of polycarboxylic acid ester groups wherein the acid is selected from the group consisting of citric, fumaric, tartaric, succinic, adipic, itaconic and terephthalic acids. Polydextrose for use in producing the reduced calorie cookies of the present invention is commercially available. A preferred commercial form for use in the present invention is polydextrose-N which is manufactured by Pfizer, Inc. Polydextrose-N is a neutralized light-colored 70% aqueous solution. The calorific value of polydextrose-N is about 0.7 calories per gram of solution or about 1 calorie per gram, dry basis. It has an average molecular weight of 1500, ranging from 162 to approximately 20,000. Typical specifications for polydextrose-N are, by weight, greater than 90% polymer, less than 4% glucose, less than 2% sorbitol, less than 4% levoglucosan, less than 0.5% citric acid, less than 0.1% 5-hydroxymethylfurfural, from 27.5 to 32.5% water, and less than 2% sulfated ash. Polydextrose-N has a viscosity of 1200±400 cps at 25° C. Additionally, it has a pH of about 5.0 to 6.0.

The water-soluble polydextrose is used in an amount, on an anhydrous or dry basis, of from about 5% by weight to about 20% by weight, preferably from about 8% to about 12% by weight, based upon the weight of the reduced calorie cookie dough. If the water-soluble polydextrose is used in an amount of less than 5%, otherbulking agents would be needed in undesirably large amounts to achieve a cookie of reduced calories. Use of the water-soluble polydextrose in amounts above 20% by weight may lead to flatulence, stool softening and even temporary diarrhea, depending on the total ingestion of the water-soluble polydextrose. Moreover, at weight percentages over about 20% by weight, it has been found that baking out of the cookies becomes difficult and raw flavor notes tend to occur.

Water insoluble or dry or powered polydextroses and/or polymaltoses may be included in the cookie doughs to replace flour and/or to enhance crispiness of the reduced calorie cookies. Suitable amounts for this purpose are less than about 8% by weight, preferably from about 1% by weight to about 3% by weight, based upon the weight of the dough. At amounts above about 8% by weight, the cookies tend to become too hard or dense.

Water insoluble or dry or powdered polydextroses or polymaltoses which can be used in the present invention are disclosed in U.S. Pat. Nos. 3,766,165 and 3,876,794 to Rennhard. As disclosed in these patents, the linkage 1–6 predominates and the insoluble polydextroses have a number average molecular weight between about 6,000 and 36,000. They contain from about 2.5 to 10 mole percent of polycarboxylic acid ester cross-linkages wherein the acid is selected from the group consisting of citric, fumaric, tartaric, succinic, adipic, itaconic, and terephthalic acids.

A suitable commercially available polydextrose in dry or powdered form for use in the present invention is manufactured by Pfizer, Inc. The polydextrose powder is an amphorous, slightly acidic fusible powder. It has a calorific value of about 1.0 calories per gram. The typical specifications are the same for the powder as for polydextrose N except the water content is less than 4% and the sulfated ash is less than 0.3%. Additionally, the pH (10% aqueous solution) is only 2.5 to 3.5, and the viscosity is only 34–36 cps for a 50% aqueous solution of the powder at 25° C.

The reduced calorie cookie doughs of the present invention comprise from about 5% by weight to about 20% by weight, preferably from about 12% to about 16% by weight, of at least one sugar. Sugars which can be used in the present invention are fructose, sucrose, dextrose, corn syrup, high fructose corn syrup, invert syrup, aqueous solutions of corn syrup solids, and mixtures thereof. The preferred sugar is sucrose because of its beneficial effects on spreading of the cookie during baking. Additionally, sucrose assits in developing an open-textured baked good. In producing "soft variety" cookies, the crystallization resistant sugars, such as high fructose corn syrup, corn syrups, fructose, dextrose, and invert syrup, should be used. In the soft variety, the preferred sugar is a mixture of high fructose corn syrup and sucrose. Suitable relative amounts are from about 20% by weight to about 60% by weight high fructose corn syrup, based upon the total weight of sucrose and high fructose corn syrup.

Suitable corn syrups for use in the shelf-stable cookie doughs of the present invention have a dextrose equivalent (DE) of about 36 to about 90. The dextrose equivalent is defined as the percentage of reducing sugars in the syrup, calculated as dextrose, on a dry weight or dry substance basis, according to the *Handbook of Sugars*, 2nd Edition, Pancoast et al, AVI Publishing Company, Inc., Westport, CT, p. 172 (1980). Suitable high fructose corn syrups which can be used in the shelf stable cookie doughs of the present invention have solids contents of about 68% to about 82% by weight.

When the amount of the one or more sugars is less than about 5% by weight, the sweetness level of the baked goods tends to become unacceptable. Additionally, somewhat more dense structures are encountered in the baked goods. At amounts above about 20% by weight of sugar, the cookie dough composition tends to become unbalanced. Thus, at excessively high sugar levels, to achieve a reduced calorie cookie, the amounts of other high calorie ingredients such as the flour, or shortening would have to be replaced by excessively high amounts of low calorie ingredients such as a water-soluble polydextrose or a cellulosic bulking agent.

The flour is used in an amount of from about 10% to about 30% by weight, preferably from about 18% to about 24% by weight, based upon the total weight of the dough composition. The flour should preferably be a low protein content flour for crispy-type cookies, which typically has a protein content of about 6.0 to about 9.5% by weight to reduce imbibing of the water and to promote a more open texture. For soft, chewy-type cookies, a higher protein content flour, suitably about 12% to about 16% by weight protein is preferred to retain water in the baked product. Exemplary of a high protein flour which can be used is bread flour fortified with vital wheat gluten. Wheat flour is preferred but other flours conventionally used in the preparation of cookies can also be utilized in the present invention. At amounts below about 10% by weight flour, the amounts of other bulking agents, such as polydextrose or cellulosic bulking agents needed to replace the flour may result in products having a poor mouthfeel or which have an increased risk of causing diarrhea.

Suitable fats and shortening are those conventionally used in the production of cookies or other sweet goods and include: (a) animal fats such as lard, and tallow, (b) hydrogenated animal oils, (c) hydrogenated or unhydrogenated vegetable oils, such as corn oil, peanut oil, coconut oil, palm oil, sunflower oil, safflower oil, and soybean oil. Mixtures of fats or shortenings can also be used. They may be emulsified or stabilized with mono-glycerides and di-glycerides, or other known emulsifiers. Commercially available emulsified or stabilized shortenings typically contain from about 2.25% to about 2.75% emulsifier by weight. The shortenings or fats can normally be solid at room temperature or above or liquid vegetable oils can be used. Fats or shortening which melt or become pourable at temperatures of about 85° F. to about 110° F., for example, are suitable for use in compositions of the present invention. The shortening or fat is used in an amount of from about 0% to about 15% by weight, preferably from about 6% to about 12% by weight, based upon the total weight of the dough.

An emulsifier or a blend of emulsifiers which has an HLB value of above 11 is preferred in the reduced calorie cookie doughs of the present invention because these emulsifiers are hydrophilic. They promote uniform distribution of the shortening into the water system of the dough. However, emulsifiers having lower HLB values can be used alone or in combination with emulsifiers having HLB values within the preferred range. As is known in the art, multi-component emulsifier systems generally provide greater emulsion stability than a single emulsifier and are accordingly preferred for use in the present invention.

Suitable emulsifiers include lactylic acid esters of fatty acids (LAEFA), ethoxylated monoglycerides (EMG) and diglycerides (EDG), polyglycerol esters (PGE) and diacetyl tartaric acid esters (DATA) and mixtures thereof. Exemplary of emulsifiers which can be used in the reduced calorie cookie doughs of the present invention are sorbitan monostearate, mono- and/or di-glycerides, polyoxyethylene sorbitan fatty acid esters, such as polysorbate 60 (polyoxyethylene(20-)sorbitan monostearate), and sodium stearoyl-2-lactylate (SSL).

The preferred emulsifier systems are: (1) a mixture of Softex ® and Emplex ® and (2) a mixture of Softex ® and Caprol PEG 860. Softex ® comprises a mixture of sorbitan monostearate and polysorbate 60, manufactured by William Tatz, Inc., New Jersey. Emplex ® is sodium stearoyl-2-lactylate (SSL), a product of Patco Products, a division of C. J. Patterson Co., Kansas City, Mo. Caprol PEG 860 is a mixture of polyglycerol esters of fatty acids, manufactured by Capitcal City Products. The ratio of Softex ® to the SSL or to the Caprol PEG 860 can suitably range from about 1:2 to about 2:1. The preferred ratio is about 1:1. An emulsifier system which has been found to result in acceptable textures in the baked goods comprises a mixture of Softex ® and diacetyl tartaric acid esters of mono- and di-glycerides. The ratio of Softex ® to the diacetyl tartaric acid esters is suitably from about 1:2 to about 2:1, preferably about 1:1. However, it has been found that the diacetyl tartaric acid esters tend to impart a slightly undesirable flavor to the baked goods.

The amount of the one or more emulsifiers should be sufficient to achieve or enhance the primary functions of fats and shortenings which are replaced. Amounts from about 0% by weight to about 10% by weight, based upon the weight of the dough, can generally be used in the doughs of the present invention to achieve: (1) acceptable tenderization and freshness preservation of the baked goods and, (2) acceptable lubrication and aeration of the doughs.

Some emulsifiers may serve as a complete replacement for the shortening or fat. Generally, these types of emulsifiers are partial glycerol esters, the major constituent of which is diglyceride. These types of emulsifiers are disclosed, for example, in U.S. Pat. No. 4,351,852. Exemplary of an emulsifier which can be used as a complete replacement for fat or shortening in the present invention is Dur-Lo ®. It is a mono- and di-glyceride emulsifier low in alpha-mono content and relatively high in di-glyceride content manufactured by SCM Durkee Industries Foods Group.

The reduced calorie cookie doughs of the present invention may contain shortening or fat without any emulsifier. The cookie dough may also contain emulsifier without any shortening or fat. However, the reduced calorie cookie doughs of the present invention should have at least 6% by weight of: (1) shortening or fat and/or (2) emulsifier. The combined weight percentages of the emulsifier and the shortening or fat should not exceed about 15% by weight of the dough. At amounts of the emulsifier/shortening or fat system below about 6% by weight, the dough consistency tends to impede machineability and dense textures tend to result in the baked goods. Increasing the amount of the emulsifier/shortening system above about 15% by weight leads to difficulty in achieving a balanced reduced calorie cookie formulation. In addition, excessive amounts of emulsifiers can cause over-expansion of the dough during baking and eventual collapse of the baked dough.

In the present invention, it is preferred to use a mixture of shortening or fat and emulsifier. The shortening or fat enhances the flavor, mouthfeel, and texture of the baked good. The emulsifier helps to reduce calories of the baked good to preserve the freshness of the baked good, and to tenderize it. The preferred amount of the emulsifier ranges from about 0.25% to about 3% by weight, most preferably from about 0.5% to about 1% by weight of the dough.

Suitable cellulosic bulking materials for use in the doughs of the present invention are microcrystalline cellulosic materials or carboxymethyl cellulose. Typically, these materials are produced by the acid hydrolysis of natural cellulose. Microcrystalline cellulose generally has a degree of polymerization of from about 125 to about 375, with less than 15% of the material having a degree of polymerization of less than 50 or more than 550. The particle size of microcrystalline cellulose materials typically range from about 1 micron to about 300 microns. The preparation of microcrystalline cellulose, and its properties, which is suitable for use in the present invention, are disclosed in U.S. Pat. No. 3,023,104. Commercially available forms of microcrystalline cellulose which can be used in the present invention include Avicel pH series 101 to 105, Avicel RC 591, and Avicel CL 611, manufactured by American Viscose Corporation, Philadelphia, Pa., a division of FMC Corporation, San Jose, Calif.

Another type of cellulosic bulking agent which can be used in the doughs of the present invention are alpha-celluloses. These materials are generally obtained from purified wood pulp in a known manner. It has been found that the alpha-celluloses tend to impart a dry mouthfeel to the baked goods. The alpha-celluloses are accordingly less preferred than the microcrystalline celluloses. When the former are used, alone or in combination with microcrystalline celluloses, their amounts should generally be less than about 10% by weight, more preferably less than about 5% by weight of the dough. A suitable commercially available alpha-cellulose for use in the present invention is Solka-Floc ® manufactured by James River Corporation, Hackensack, N.J.

The total amount of cellulosic bulking agent should generally be from about 4% by weight to about 15% by weight, preferably from about 6% to 11% by weight of the dough. Amounts of cellulosic bulking agents above about 15% by weight tend to result in baked goods which are undesirably hard. Preferably at least about 75% by weight of the cellulosic bulking agent is a microcrystalline cellulose.

The leavening system of the present invention comprises: (1) at least one edible bicarbonate and/or carbonate salt and (2) at least one acidifier which releases at least about 50% of the leavening gas during baking. The leavening system exhibits a delayed leavening action so that leavening occurs predominantly in the oven, rather than prior to baking. A more tender, open structure is achieved by the delayed leavening activity. Most preferably the leavening action occurs predominantly at the end of the baking. The leavening system is used in an amount of from about 0.5% by weight to about 3% by weight, preferably from about 1.0% by weight to about 2.5% by weight, based upon the weight of the dough. Amounts less than about 0.5% by weight tend to result in baked goods having coarse and dense cell structures.

Exemplary of the bicarbonate and carbonate salts are sodium bicarbonate, ammonium bicarbonate, potassium bicarbonate, potassium carbonate, and mixtures thereof.

Exemplary of acidifiers which can be used are sodium acid pyrophosphate, diammonium hydrogen phosphate (anhydrous), coated monocalcium phosphate, dicalcium phosphate dihydrate, sodium aluminum phosphate, acidic, a mixture of sodium aluminum phosphate, acidic with aluminum sulfate anhydrous, a mixture of sodium aluminum phosphate, acidid with anhydrous, coated monocalcium phosphate, and mixtures thereof. Gas release rates of these leavening acids are reported in Reiman, H., in "Chemical Leavening System", *Baker's Digest,* pps. 37–40, (July/August 1983). The bicarbonate and/or carbonate salts and/or the acidifiers may be fat-encapsulated or shortening-encapsulated to delay leavening action so that leavening occurs predominantly in the oven rather than prior to baking.

The relative amounts of the at least one bicarbonate and/or carbonate salt and the at least one acidifier are generally such so as to provide sufficient generation of leavening gases and to result in an acceptable pH in the final baked product. Suitable weight ratios of the at least one bicarbonate and/or carbonate salt to the at least one acidifier range from about 0.9:1 to about 2.4:1, preferably from about 1.15:1 to about 1.8:1 for crispy-type cookies. For soft- or chewy-type cookies, a suitable ratio is from about 0.5:1 to about 1.7:1, preferably from about 0.8:1 to about 1.2:1.

A preferred leavening system for producing reduced calorie cookies of the crispy variety comprises ammonium bicarbonate, diammonium hydrogen phosphate, sodium bicarbonate and sodium acid pyrophosphate. Relative amounts of these leavening agents which can be used are from about 25% to about 35%, preferably from about 27% by weight to about 32% by weight ammonium bicarbonate, from about 15% by weight to about 25% by weight, preferably from about 18% to about 23% by weight diammonium hydrogen phosphate, from about 25% to about 35% by weight, preferably from about 27% by weight to about 32% by weight sodium bicarbonate, and from about 15% to about 25% by weight, preferably from about 18% to about 23% by weight sodium acid pyrophosphate, said percentages being based upon the total weight of the leavening system and adding up to 100%.

Leavening agents which release ammonia should be avoided in soft or chewy variety cookies because undesirable flavor or odors tend to occur. It is believed that the relatively high levels of water which are present in these types of cookies dissolves or reacts with ammonia so as to form ammonium hydroxide in an amount which is sufficient to result in an off-flavor or objectionable odor in the final baked good. The leavening system for soft variety cookies preferably comprises sodium bicarbonate and sodium aluminum phosphate, acidic. Relative amounts of these leavening agents which can be used are from about 40% to about 60% by weight, preferably from about 48% by weight to about 52% by weight, sodium bicarbonate and from about 40% by weight to about 60% by weight, preferably from about 48% by weight to about 52% by weight sodium aluminum phosphate, acidic, said percentages being based upon the total weight of the leavening system and adding up to 100%.

The reduced calorie baked goods of the present invention should have a pH in the range of from about 6.8 to about 9. A pH of from about 7 to about 7.4 is preferred for cookies of the soft variety. The crispy varieties of cookies should preferably have a pH of from about 7.9 to about 8.3. It has been found that crispy baked goods having a pH of from about 7.9 to about 8.3 are unexpectedly more tender than baked goods having a pH outside this range. At a pH of less than about 6.8, the baked goods tend to exhibit less acceptable textural characteristics. At a pH above about 9, the baked goods tend to be too alkaline tasting.

To achieve a desired pH in the final baked good, an edible alkaline agent or material can be incorporated into the doughs of the present invention. Generally, if no alkaline agent is used with the leavening system of the present invention, the pH in the final baked product ranges from about 6.8 to about 7.4. Suitable edible alkaline agents for use in the present invention include carbonates and/or hydroxides of sodium and potassium. The preferred edible alkaline agent is sodium hydroxide. The edible alkaline agent should be added as an aqueous solution to avoid the occurrence of hot spots or local concentrations of the alkaline material. The amount of alkaline material added should be sufficient to provide a pH within the above-described ranges. Typically, from about 0.1% by weight to about 0.5% by weight of the edible alkaline agent, based upon the weight of the dough is used. This amount of edible alkaline agent is suitably dissolved in an amount of water which provides from about a 40% to about 60% aqueous solution.

Measurement of the pH of the final baked product and making adjustments in the amount of edible alkaline agent in the dough to obtain a desired pH is within the abiity of one ordinarily skilled in the art. A fast, accurate method particularly suitable for monitoring production runs is to grind the baked, final product, suspend it in distilled water to form a 10% by weight slurry, and to make adjustments in the alkaline agent level in the dough based upon the pH of the slurry.

The moisture content of the doughs of the present invention generally ranges from about 15% by weight to about 30% by weight, based upon the weight of the dough. The preferred moisture content of the cookie doughs of the present invention is from about 20% by weight to about 26% by weight. Generally the addition of water, in amounts of about 10% by weight to about 18% by weight of the final dough provides a final moisture content which is suitable for dough machineability.

The final baked good should preferably have a water activity of less than about 0.7. The water content of the soft cookies of the present invention should preferably be from about 9% by weight to about 15% by weight, based upon the weight of the final baked good. Crispy cookies should preferably have a moisture content of about 3% to about 6% by weight, based upon the weight of the final baked cookie. At moisture contents above about 15% by weight the cookies tend to exhibit a soggy taste.

The doughs of the present invention can optionally include bulking agents such as dietary fiber and hydrocolloids. Corn fiber, soy filtrate, wheat bran, psyllium fiber, and apple pomace fiber (dehydrated and freeze-dried) are exemplary of dietary fibers which can be used in the present invention. Suitable amounts range up to about 10% by weight, based upon the weight of the dough. The preferred dietary fiber is wheat bran. Exemplary of hydrocolloids which can be used are xanthan gum, gelatin, guar gum, methocel, agar and humectant gels. Suitable amounts of the hydrocolloids range up to about 5% by weight, based upon the weight of the dough. Humectant gels in amounts up to about 10% by weight can be used for the production of soft variety cookies. Humectant gels which can be used in the cookie doughs of the present invention include those disclosed in commonly-assigned U.S. Ser. No. 293,924 filed Aug. 18, 1981 for "Method and Composition for Soft Edible Baked Products Having Improved Extended Shelf-Life and an Edible Firm Gel For Use Therein", now U.S. Pat. No. 4,444,799, and in corresponding South African Pat. No. 82/4825, granted Apr. 27, 1983 herein incorporated by reference in their entirety.

Texturizing and flavoring ingredients conventionally used in the production of the baked goods are used in the reduced calorie baked goods of the present invention. The amounts employed in the reduced calorie baked goods are generally comparable to those used in the conventional formulation so as to achieve satisfactory mouthfeel, texture and taste. Typical amounts of the conventional texturizing and flavoring ingredients used in the production of drop-type cookies range from about 5% by weight up to about 25% by weight, based upon the weight of the cookie dough. Exemplary of drop-type cookies are sugar cookies, butter cookies, chocolate chip cookies, peanut butter cookies, butterscotch/chocolate chip cookies, butterscotch cookies, oatmeal/raisin cookies, and oatmeal cookies.

Typical cookie flavoring and texturizing ingredients include salt, whole egg powder, egg white powder, whey powder, milk powders, malt flour, potato flakes, pregelatinized starches such as pregelatinized corn, tapioca, or wheat starch, waxy maize starch, maltodextrins, peanut butter, peanut flour, vanilla cocoa, spices such as cinnamon and nutmeg, sweeteners such as acesulfame-K, aspartame and tallin, particulate flavoring ingredients such as chocolate, caramel, or butterscotch chips, cereal grains such as oats and rice, raisins and nut meats. Commercially available chips which are coated with an edible shellac are preferred for reduced smearing into the dough during mixing or pumping. Pregelatinized wheat starch and dehydrated potato flakes or flour are preferred for tenderization of crispy variety cookies. Additionally, pregelatinized wheat starch has been found to reduce dough stickiness without the need for prolonged lay times to achieve optimal dough machineability. Suitable amounts range from about 2% by weight to about 15% by weight pregelatinized starch and from about 1% by weight to about 6% by weight dehydrated potato, based upon the weight of the dough.

The reduced calorie doughs of the present invention can be made by combining the ingredients using a creaming stage and a dough-forming stage. Any fat-encapsulated leavening agent should be added in the dough forming stage to minimize breakdown of the fat encapsulant. The particulate flavoring ingredients which are intended to maintain their integrity but which tend to smear upon mixing, such as chocolate chips, butterscotch chips, caramel drops and the like should be added last. They are added with minimal mixing so as to distribute them substantially uniformly through the dough without substantial destruction of the integrity of the particles.

Generally, all of the wet ingredients such as the solubilized polydextrose, optional corn syrup, liquid flavoring and texturizing ingredients, water, aqueous edible alkaline agent, aqueous solutions of leavening agent, aqueous solutions of sweeteners, liquid humectants such as molasses and honey, the fat or shortening, emulsifiers, and the sucrose are creamed together to form a substantially homogeneous mixture. Preferably, the emulsifiers are preblended with the shortening or fat to assure uniform, rapid distribution of the emulsifiers in the dough.

In the dough-forming stage, the flour, dry leavening agents, such as sodium acid pyrophosphate, sodium bicarbonate or encapsulated sodium bicarbonate, and cellulosic bulking agent are added to the creamed mixture and mixing is continued until the dough clears to obtain a substantially homogeneous dough. To assure the attainment of homogeneity, it is preferably to preblend the dry ingredients prior to adding them to the creamed mixture. When insoluble or powdered polydextrose or polymaltose is used, it should be preblended with the other dry ingredients prior to addition to the creamed mixture. The direct addition of the insoluble or powdered polysaccharide to the wet ingredients would tend to result in the formation of lumps in the dough. The dry flavoring and texturizing ingredients and optional fiber can be added in either the creaming stage or the dough-forming stage. The particulate flavoring ingredients are added to the dough last with minimal mixing.

The optional sweeteners are preferably added in the creaming or dough forming stage rather than to the surface of the baked good to avoid extra processing and equipment. Amounts which enhance the sweetness provided by the at least one sugar can be used. Less than about 0.2% by weight sweetener, based upon the weight of the dough generally results in acceptably sweet products.

Heat-sensitive sweeteners, such as aspartame however, are preferably added to at least one surface of the baked product to avoid decomposition. They may be added dry, as a solution, or as a suspension. The method of addition should not adversely affect the appearance, or texture, or taste of the baked good. For example, aspartame may be added dry to a sugar cookie to provide a sugar coating appearance. However, a sugared appearance or white specks would be objectionable on a chocolate chip cookie. It has been found that the application of an alcoholic solution or homogeneous alcoholic suspension of aspartame does not: (1) result in sogginess of the baked good or (2) the appearance of white specks on the baked good.

Non-aqueous alcoholic solutions are preferred, particularly for application of aspartame to crispy variety cookies. The ethanol evaporates quickly and essentially completely thereby reducing the introduction of excessive moisture into the cookie. External heating at temperatures of about 180° F. to about 230° F. for about 5 to 10 minutes can be used to evaporate the solvent. Soft variety cookies can generally withstand the introduction of moisture from an aqueous alcoholic solution of aspartame because moistness is compatible with their desired texture.

Mixing is typically performed at ambient temperatures of about 65° F. to about 85° F., preferably 70° F. to 74° F., without external heating. A preferred final dough temperature for optimal machineability ranges from about 72° F. to about 76° F. Suitable mixers include vertical and horizontal mixers, such as conventional bakery-type Hobart mixers. Excessive mixing in the dough forming stage should be avoided because it tends to result in sticky doughs which require long lay times to obtain a machineable dough. Lay times should preferably be no longer than about one hour.

The doughs of the present invention are formed into pieces in conventional manner using known bakery equipment such as wire cutting devices, rotary cutters, reciprocating cutters and the like. The dough pieces are preferably baked in solid band ovens for commercial scale operations.

Baking temperatures and times for the doughs of the present invention are those conventionally used. In known band ovens, cookie baking temperatues typically range from about 190° F. to about 600° F. in the different zones. Typical cookie baking temperatures range from about 325° F. to about 450° F. in conventional non-band home-type or commercial ovens. Typical cookie baking times range from about 7 minutes to about 15 minutes, depending upon the number of cookies being baked, the thickness of the cookie, the shape of the cookies, the size of the cookies, the oven temperature, the cookie ingredients, the texture desired, and the desired moisture content of the final product.

The doughs may be used to produce soft textured or crispy textured reduced calorie drop-cookies, sandwich type cookies, filled cookies, and the like, or multiple textured cookies of extended shelf life. The latter type of cookies can be produced by enrobing a reduced calorie soft cookie dough with a reduced calorie crispy cookie dough.

As employed in the context of the present invention, the term "chewy" is intended to define textures which possess a discernible degree of plasticity. Chewiness also connotes impressions of softness and moistness. Crispiness and chewiness can be described in terms of taste panel tests which take as standards the texture of fresh saltine crackers having a moisture content of about 2% (rating of 0) and a freshly baked cookie having a distinctly chewy texture throughout (rating of 10): i.e., chewy cookies prepared in accordance with the following recipe:

⅔ c. sugar
¼ c. butter or regular margarine
1 tsp. ground ginger
½ tsp. ground cinnamon
½ tsp. baking soda
½ tsp. salt
½ tsp. vanilla
1 egg
½ c. honey
1½ c. sifted flour The cookies are prepared by combining ⅔ cup of sugar, butter, ginger, cinnamon, baking soda, salt and vanilla in a large mixing bowl and creaming the ingredients until they are light and fluffy. Next the eggs are added and beat in until the mixture is very fluffy. The honey is blended in, followed by the blending in of the flour a little at a time. The dough is dropped by teaspoonfuls 2½ inches apart onto a lightly greased baking sheet, baked at 350° F. for 10 to 15 minutes until lightly browned and removed at once from the baking sheet to racks to cool thoroughly.

Employing the rating scale described above, the chewy portion of the product of this invention preferably has a rating of at least 3 and most preferably at least 5. The crispy portion preferably has a rating of less than 5 and most preferably less than 2. The regions should show a difference in ratings of at least 2 units, and most preferably at least 5 units.

The present invention is further illustrated by the following examples, in which all parts, proportions and percentages are by weight and all temperatures are in °F. unless otherwise indicated:

EXAMPLE 1

The ingredients and their relative amounts, based upon the weight of the dough, used to prepare a chocolate chip cookie of the crispy variety are:

| INGREDIENT | % |
|---|---|
| Flour | 18 |
| Pregelatinized Wheat Starch | 8 |
| Potato Flakes | 2 |
| Malt Flour | 0.5 |
| Microcrystalline Cellulose | 7 |
| Sodium Bicarbonate | 0.62 |
| Sodium Acid Pyrophosphate | 0.37 |
| Ammonium Bicarbonate | 0.59 |
| Diammonium Hydrogen Phosphate | 0.39 |
| Sucrose | 13.75 |
| Vegetable Shortening | 7 |
| Softex ® Emulsifier | 0.3 |
| Emplex ® Emulsifier | 0.3 |
| Polydextrose-N | 15 |
| Minor Flavoring Ingredients | 1.55 |
| Sodium Hydroxide (50% aqueous solution) | .43 |
| Water | 14.50 |
| Chocolate Drops | 9.7 |
| | 100.0 |

A portion of the water is used to form separate solutions of the ammonium bicarbonate and the diammonium hydrogen phosphate. The sucrose, shortening, emulsifiers, polydextrose-N, minor flavoring ingredients, remaining water, and aqueous sodium hydroxide are creamed together in a Hobart mixer for about six minutes to obtain a substantially homogeneous mixture. The ammonium bicarbonate solution and the diammonium phosphate solution are sequentially blended into the mixture for about 1½ minutes each to obtain a substantially homogeneous blend.

The flour, pregelatinized wheat starch, potato flakes, malt flour, microcrystalline cellulose, sodium bicarbonate, and sodium acid pyrophosphate are dumped onto the substantially homogeneous blend and mixing is continued for about three minutes to achieve a substantially homogeneous dough. The chocolate drops are added to the dough with minimal mixing for about 30 seconds to distribute them substantially uniformly throughout the dough without substantial destruction of the integrity of the particles.

The dough is formed into pieces using a wire cutting device to obtain cookies of about 2¼″ diameter and ¼″ thickness. The dough pieces are baked in a solid band oven, having top and bottom burners at temperatures ranging from about 190° F. to about 600° F. to obtain cookies having a moisture content of about 5.3% by weight.

The pH of the final baked product is determined by grinding it, suspending it in distilled water to form a 10% by weight slurry, and measuring the pH of the slurry. The pH of the product is about 8.3.

The calorie content of the final baked cookie, calculated using U.S. Dept. of Agriculture's (*Composition of Foods Handbook,* No. 8, 1963) and manufacturer's standard calorific values for the ingredients is about 3.7 calories/gm. The caloric reduction is about 25% based upon a conventional chocolate chip cookie made from a formulation comprising flour, shortening, sugar, leavening, chocolate drops, and cookie flavoring and texturizing ingredients.

EXAMPLE 2

The ingredients and their relative amounts, based upon the weight of the dough, used to prepare a butter cookie of the crispy variety are:

| INGREDIENT | % |
| --- | --- |
| Flour | 21.2 |
| Pregelatinized Wheat Starch | 7 |
| Microcrystalline Cellulose | 7 |
| Potato Flakes | 2 |
| Sodium Bicarbonate | 0.62 |
| Sodium Acid Pyrophosphate | 0.50 |
| Ammonium Bicarbonate | 0.56 |
| Diammonium Hydrogen Phosphate | 0.47 |
| Sodium Hydroxide (50% aqueous solution) | 0.40 |
| Sucrose | 14 |
| Butter | 3 |
| Minor Flavoring Ingredients | 2 |
| Polydextrose-N | 15.5 |
| Vegetable Shortening | 7.5 |
| Emplex ® Emulsifier | 0.25 |
| Softex ® Emulsifier | 0.25 |
| Water | 17.75 |
| | 100.0 |

The ingredients are combined as in Example 1 to form a dough with the butter being added in the creaming stage. The dough is formed into pieces and baked as in Example 1 to obtain a final baked product having a moisture content of about 5.2% by weight. The pH of the final product, measured as in Example 1 is 8.2. The calorie content of the cookie, calculated using standard calorific values for the ingredients is about 3.5 calories/gm. The caloric reduction is about 25% based upon a conventional butter cookie made from a formulation comprising flour, vegetable shortening, sugar, leavening, butter, and cookie flavoring and texturizing ingredients.

EXAMPLE 3

The ingredients and their relative amounts, based upon the weight of the dough, used to prepare a peanut butter cookie of the crispy variety are:

| INGREDIENT | % |
| --- | --- |
| Flour | 20 |
| Pregelatinized Wheat Starch | 8 |
| Microcrystalline Cellulose | 6.5 |
| Potato Flakes | 3 |
| Sodium Bicarbonate | 0.60 |
| Sodium Acid Pyrophosphate | 0.45 |
| Ammonium Bicarbonate | 0.57 |
| Diammonium Hydrogen Phosphate | 0.46 |
| Sucrose | 13 |
| Minor Flavoring Ingredients | 1.3 |
| Polydextrose-N | 15.5 |
| Peanut Butter | 11 |
| Vegetable Shortening | 7 |
| Softex ® Emulsifier | 0.5 |
| Water | 12.12 |
| | 100.0 |

The ingredients are combined as in Example 1 to form a dough with the peanut butter being added in the creaming stage. The dough is formed into pieces and baked as in Example 1 to obtain a final baked product having a moisture content of about 5.0% by weight. The pH of the final product, measured as in Example 1 is 7.2. The calorie content of the cookie, calculated using standard calorific values for the ingredients is about 3.7 calories/gm. The caloric reduction is about 25% based upon a conventional butter cookie made from a formulation comprising flour, vegetable shortening, sugar, leavening, peanut butter, and cookie flavoring and texturizing ingredients.

EXAMPLE 4

The ingredients and their relative amounts, based upon the weight of the dough, used to prepare an oatmeal/raisin cookie of the crispy variety are:

| INGREDIENT | % |
| --- | --- |
| Flour | 18.75 |
| Pregelatinized Wheat Starch | 7.5 |
| Potato Flakes | 2 |
| Microcrystalline Cellulose | 5.4 |
| Wheat Bran | 2.5 |
| Sodium Bicarbonate | 0.56 |
| Sodium Acid Pyrophosphate | 0.50 |
| Diammonium Hydrogen Phosphate | 0.50 |
| Ammonium Bicarbonate | 0.55 |
| Sucrose | 14 |
| Polydextrose-N | 13.5 |
| Minor Flavoring Ingredients | 1.55 |
| Rolled Oat Flakes | 7.5 |
| Ground Raisins | 2.45 |
| Vegetable Shortening | 7 |
| Emplex ® Emulsifier | 0.32 |
| Softex ® Emulsifier | 0.32 |
| Water | 15.10 |
| | 100.0 |

The ingredients are combined as in Example 1 to form a dough with the bran, raisins, and oats being added in the dough forming stage. The dough is formed into pieces and baked as in Example 1 to obtain a final baked product having a moisture content of about 5.5% by weight. The pH of the final product, measured as in Example 1 is 7.2. The calorie content of the cookie, calculated using standard calorific values for the ingredients is about 3.5 calories/gm. The caloric reduction is about 25% based upon a conventional butter cookie made from a formulation comprising flour, vegetable shortening, sugar, leavening, oats, raisins and cookie flavoring and texturizing ingredients.

EXAMPLE 5

The ingredients and their relative amounts, based upon the weight of the dough, used to prepare a chocolate chip and butterscotch cookie of the crispy variety are:

| INGREDIENT | % |
| --- | --- |
| Flour | 16.5 |
| Pregelatinized Wheat Starch | 8 |
| Microcrystalline Cellulose | 7.5 |
| Potato Flour | 2 |
| Malt Flour | 0.5 |
| Sodium Bicarbonate | 0.64 |
| Sodium Acid Pyrophosphate | 0.49 |
| Ammonium Bicarbonate | 0.62 |
| Diammonium Hydrogen Phosphate | 0.50 |
| Sucrose | 13.8 |
| Polydextrose-N | 15 |
| Vegetable Shortening | 8 |
| Softex ® Emulsifier | 0.32 |
| Emplex ® Emulsifier | 0.32 |
| Minor Flavoring Ingredients | 1 |
| Sodium Hydroxide (50% aqueous solution) | 0.39 |
| Water | 14.42 |
| Butterscotch Drops | 5 |
| Chocolate Drops | 5 |
| | 100.0 |

The ingredients are combined as in Example 1 to form a dough with the butterscotch drops and chocolate drops being added together. The dough is formed into pieces and baked as in Example 1 to obtain a final baked product having a moisture content of about 5.4% by weight. The pH of the final product, measured as in Example 1 is 8.2. The calorie content of the cookie, calculated using standard calorific values for the ingredients is about 3.6 calories/gm. The caloric reduction is about 27% based upon a conventional butter cookie made from a formulation comprising flour, vegetable shortening, sugar, leavening, chocolate drops, butterscotch drops and cookie flavoring and texturizing ingredients.

EXAMPLE 6

The ingredients and their relative amounts, based upon the weight of the dough, used to prepare a sugar cookie of the crispy variety are:

| INGREDIENT | % |
| --- | --- |
| Flour | 20 |
| Pregelatinized Wheat Starch | 7 |
| Microcrystalline Cellulose | 9 |
| Potato Flakes | 2 |
| Sodium Bicarbonate | 0.68 |
| Sodium Acid Pyrophosphate | 0.45 |
| Ammonium Bicarbonate | 0.61 |
| Diammonium Hydrogen Phosphate | 0.5 |
| Sugar | 15.5 |
| Minor Flavoring Ingredients (Vanilla and salt, 1:1) | 1 |
| Vegetable Shortening | 10 |
| Softex ® Emulsifier | 0.36 |
| Emplex ® Emulsifier | 0.40 |
| Polydextrose-N | 16 |
| Water | 16.5 |
| | 100.0 |

The ingredients are combined as in Example 1 to form a dough. The dough is formed into pieces and baked as in Example 1 to obtain a final baked product having a moisture content of about 4.9% by weight. The pH of the final product, measured as in Example 1 is 7.4. The calorie content of the cookie, calculated using standard calorific values for the ingredients is about 3.5 calories/gm. The caloric reduction is about 25% based upon a conventional butter cookie made from a formulation comprising flour, vegetable shortening, sugar, leavening, vanilla flavoring and cookie flavoring and texturizing ingredients.

EXAMPLE 7

The ingredients and their relative amounts, based upon the weight of the dough, used to prepare a chocolate chip cookie of the crispy variety are:

| INGREDIENT | % |
| --- | --- |
| Flour | 22.4 |
| Vegetable Shortening | 7.5 |
| Emplex ® Emulsifier | 0.5 |
| Sucrose | 12.7 |
| Polydextrose-N | 10.4 |
| Polydextrose Powder (Pfizer, Inc.) | 2.0 |
| Pregelatinized Wheat Starch | 5.5 |
| Alpha Cellulose (Solka-Floc) | 4.8 |
| Whey Powder | 2.0 |
| Wheat Bran | 4.66 |
| Chocolate Drops | 10.4 |
| Sodium Bicarbonate | 0.62 |
| Ammonium Bicarbonate | 0.45 |
| Diammonium Hydrogen Phosphate | 0.39 |
| Dicalcium Phosphate Dihydrate | 0.28 |
| Water | 14.0 |
| Minor Flavoring Ingredients | 1.4 |
| | 100.0 |

The ammonium bicarbonate, diammonium hydrogen phosphate, water, sucrose, vegetable shortening, emulsifiers, polydextrose-N, and minor flavoring ingredients are combined as in Example 1 to form a creamed mixture. The polydextrose powder is preblended with the flour, alpha-cellulose, pregelatinized wheat starch, whey powder, wheat bran, sodium bicarbonate, and dicalcium phosphate dihydrate to obtain a substantially uniform dry blend. The dry blend is dumped onto the creamed mixture and mixing is continued to obtain a substantially homogeneous dough as in Example 1. The chocolate drops are added to the dough as in Example 1. The dough is formed into pieces and baked as in Example 1 to obtain a final baked product having a moisture content of about 5.0% by weight. The pH of the final product, measured as in Example 1 is 7.2. The calorie content of the cookie, calculated using standard calorific values for the ingredients is about 3.7 calories/gm. The caloric reduction is about 25% based upon a conventional butter cookie made from a formulation comprising flour, vegetable shortening, sugar, leavening, chocolate drops and cookie flavoring and texturizing ingredients.

EXAMPLE 8

The ingredients and their relative amounts, based upon the weight of the dough, used to prepare a chocolate chip cookie of the crispy variety are:

| INGREDIENT | % |
| --- | --- |
| Flour | 18 |
| Pregelatinized Wheat Starch | 6.52 |
| Potato Flakes | 2.5 |
| Malt Flour | 0.54 |
| Microcrystalline Cellulose | 7.85 |
| Sodium Bicarbonate | 0.60 |
| Sodium Acid Pyrophosphate | 0.37 |
| Ammonium Bicarbonate | 0.59 |
| Diammonium Hydrogen Phosphate | 0.39 |
| Sucrose | 13.81 |
| Vegetable Shortening | 6.85 |
| Softex ® Emulsifier | 0.31 |
| Emplex ® Emulsifier | 0.31 |

| INGREDIENT | % |
|---|---|
| Polydextrose-N | 14.93 |
| Minor Flavoring Ingredients | 1.50 |
| Sodium Hydroxide (50% aqueous solution) | 0.43 |
| Water | 14 |
| Chocolate Drops | 10.5 |
| | 100.0 |

The ingredients are combined as in Example 1 to form a dough. The dough is formed into pieces and baked as in Example 1 to obtain a final baked product having a moisture content of about 6.0% by weight. The pH of the final product, measured as in Example 1 is 8.3. The calorie content of the cookie, calculated using standard calorific values for the ingredients is about 3.4 calories/gm. The caloric reduction is about one-third based upon a conventional butter cookie made from a formulation comprising flour, vegetable shortening, sugar, leavening, chocolate drops and cookie flavoring and texturizing ingredients.

EXAMPLE 9

The ingredients and their relative amounts, based upon the weight of the dough, used to prepare a chocolate chip cookie of the soft variety are:

| INGREDIENT | % |
|---|---|
| Bread Flour | 20 |
| Vital Wheat Gluten | 4.60 |
| Pregelatinized Wheat Starch | 3 |
| Microcrystalline Cellulose | 7.50 |
| Egg White Powder | 1 |
| Sodium Bicarbonate | 0.70 |
| Sodium Aluminum Phosphate | 0.60 |
| Sucrose | 8 |
| Polydextrose-N | 13.45 |
| Humectant Gel | 5.65 |
| High Fructose Corn Syrup | 5.50 |
| Vegetable Shortening | 8 |
| Softex ® Emulsifier | 0.25 |
| Emplex ® Emulsifier | 0.25 |
| Minor Flavoring Ingredients | 1.50 |
| Water | 10 |
| Chocolate Drops | 10 |
| | 100.0 |

The humectant gel is made from 93.9 parts by weight high fructose corn syrup, 2.82 parts by weight glycerine, 1.17 parts by weight sodium alginate gum (Kelco Gel HV sold by Kelco Division, Merck & Co., Inc., Clark, N.J.), 1.17 parts by weight calcium sulfate dihydrate and 0.94 parts by weight propylene glycol in accordance with Example I of commonly assigned U.S. Ser. No. 293,924, filed Aug. 18, 1981 and corresponding South African Pat. No. 82/4825, granted Apr. 27, 1983. The humectant gel is ground into pieces in a food chopper and blended with the sucrose. The blend is then creamed with the shortening, polydextrose-N, emulsifiers, high fructose corn syrup, water, and minor flavoring ingredients to form a substantially homogeneous mixture as in Example 1.

The flour, vital wheat gluten, pregelatinized wheat starch, microcrystalline cellulose, egg white powder, sodium bicarbonate, and sodium aluminum phosphate are dumped onto the substantially homogeneous mixture and mixing is continued to obtain a substantially homogeneous dough as in Example 1. The chocolate drops are added to the dough as in Example 1.

The dough is formed into pieces and baked as in Example 1 to obtain a final baked product having a moisture content of about 12.0% by weight. The pH of the final product, measured as in Example 1 is 7.1. The calorie content of the cookie, calculated using standard calorific values for the ingredients is about 3.7 calories/gm. The caloric reduction is about 25% based upon a conventional butter cookie made from a formulation comprising flour, vegetable shortening, sugar, leavening, chocolate drops, high fructose syrup and cookie flavoring and texturizing ingredients.

EXAMPLE 10

Multitextured cookies are produced by enrobing the soft cookie dough of Example 9 in the crispy cookie doughs of Examples 1 and 7, respectively to obtain cookies which are soft and chewy on the inside and crunchy on the outside.

EXAMPLE 11

The ingredients and their relative amounts, based upon the weight of the dough, used to prepare a butterscotch chocolate chip cookie of the crispy variety are:

| INGREDIENT | % |
|---|---|
| Flour | 18.8 |
| Vegetable Shortening | 9 |
| Emplex ® Emulsifier | 0.5 |
| Sucrose | 14 |
| Polydextrose-N | 12.4 |
| Polydextrose Powder (Pfizer, Inc.) | 1 |
| Pregelatinized Wheat Starch | 4.2 |
| Alpha Cellulose (Solka-Floc) | 5 |
| Whey Powder | 2.7 |
| Sodium Bicarbonate | 0.70 |
| Ammonium Bicarbonate | 0.60 |
| Sodium Acid Pyrophosphate | 0.65 |
| Diammonium Hydrogen Phosphate | 0.55 |
| Wheat Bran | 4 |
| Chocolate Drops | 6 |
| Butterscotch Drops | 4 |
| Water | 14.4 |
| Minor Flavoring Ingredients | 1.5 |
| | 100.0 |

The ingredients are combined as in Example 7 to form a dough with the sodium acid pyrophosphate replacing the dicalcium phosphate dihydrate, and the butterscotch drops being added with the chocolate drops. The dough is formed into pieces and baked as in Example 1 to obtain a final baked product having a moisture content of about 5.8% by weight. The pH of the final product, measured as in Example 1 is 7.2. The calorie content of the cookie, calculated using standard calorific values for the ingredients is about 3.7 calories/gm. The caloric reduction is about 25% based upon a conventional butter cookie made from a formulation comprising flour, vegetable shortening, sugar, leavening, chocolate drops, butterscotch drops and cookie flavoring and texturizing ingredients.

EXAMPLE 12

The ingredients and their relative amounts, based upon the weight of the dough, used to prepare a butterscotch chocolate chip cookie of the crispy variety are:

| INGREDIENT | % |
|---|---|
| Flour | 21.6 |
| Vegetable Shortening | 9 |

| INGREDIENT | % |
| --- | --- |
| Sucrose | 14 |
| Polydextrose-N | 12.51 |
| Polydextrose Powder (Pfizer, Inc.) | 2 |
| Pregelatinized Wheat Starch | 4.4 |
| Microcrystalline Cellulose | 8 |
| Chocolate Drops | 6 |
| Butterscotch Drops | 4 |
| Sodium Bicarbonate | 0.70 |
| Ammonium Bicarbonate | 0.60 |
| Diammonium Hydrogen Phosphate | 0.55 |
| Sodium Acid Pyrophosphate | 0.65 |
| Water | 13.5 |
| Softex ® Emulsifier | 0.27 |
| Emplex ® Emulsifier | 0.27 |
| Minor Flavoring Ingredients | 1.95 |
| | 100.0 |

The ingredients are combined as in Example 11 to form a dough with the microcrystalline cellulose replacing the alpha-cellulose, and the Softex ® being added with the Emplex ®. The dough is formed into pieces and baked as in Example 1 to obtain a final baked product having a moisture content of about 5.6% by weight. The pH of the final product, measured as in Example 1 is 7.2. The calorie content of the cookie, calculated using standard calorific values for the ingredients is about 3.7 calories/gm. The caloric reduction is about 25% based upon a conventional butter cookie made from a formulation comprising flour, vegetable shortening, sugar, leavening, chocolate drops, butterscotch drops and cookie flavoring and texturizing ingredients.

EXAMPLE 13

The ingredients and their relative amounts, based upon the weight of the dough, used to prepare a butterscotch cookie of the cripsy variety are:

| INGREDIENT | % |
| --- | --- |
| Flour | 19.13 |
| Vegetable Shortening | 9.5 |
| Sucrose | 14 |
| Polydextrose-N | 15 |
| Pregelatinized Wheat Starch | 7 |
| Microcrystalline Cellulose | 5.27 |
| Potato Flakes | 2 |
| Sodium Hydroxide Solution (50/50) | 0.43 |
| Sodium Bicarbonate | 0.70 |
| Ammonium Bicarbonate | 0.65 |
| Diammonium Hydrogen Phosphate | 0.55 |
| Sodium Acid Pyrophosphate | 0.65 |
| Butterscotch Drops | 10.2 |
| Water | 13 |
| Softex ® Emulsifier | 0.31 |
| Emplex ® Emulsifier | 0.31 |
| Minor Flavoring Ingredients | 1.3 |
| | 100.0 |

The ingredients are combined as in Example 1 to form a dough with the butterscotch drops replacing the chocolate chip drops. The dough is formed into pieces and baked as in Example 1 to obtain a final baked product having a moisture content of about 5.3% by weight. The pH of the final product, measured as in Example 1 is 8.3. The calorie content of the cookie, calculated using standard calorific values for the ingredients is about 3.7 calories/gm. The caloric reduction is about 25% based upon a conventional butter cookie made from a formulation comprising flour, vegetable shortening, sugar, leavening, butterscotch drops and cookie flavoring and texturizing ingredients.

EXAMPLE 14

The ingredients and their relative amounts, based upon the weight of the dough, used to prepare a sugar cookie of the crispy variety are:

| INGREDIENT | % |
| --- | --- |
| Flour | 20 |
| Pregelatinized Wheat Starch | 8.5 |
| Vegetable Shortening | 8.6 |
| Potato Flakes | 2.6 |
| Sucrose | 14.9 |
| Polydextrose-N | 16 |
| Carboxymethyl Cellulose (CMC) | 10.5 |
| Sodium Bicarbonate | 0.70 |
| Ammonium Bicarbonate | 0.60 |
| Diammonium Hydrogen Phosphate | 0.55 |
| Sodium Acid Pyrophosphate | 0.65 |
| Water | 14.39 |
| Emplex ® Emulsifier | 0.28 |
| Softex ® Emulsifier | 0.28 |
| Sodium Hydroxide Solution (50/50) | 0.40 |
| Minor Flavoring Ingredients (Vanilla, Butter Flavor, and Salt) | 1.05 |
| | 100.0 |

The ingredients are combined as in Example 1 to form a dough. The dough is formed into pieces and baked as in Example 1 to obtain a final baked product having a moisture content of about 5.0% by weight. The pH of the final product, measured as in Example 1 is 8.3. The calorie content of the cookie, calculated using standard calorific values for the ingredients is about 3.1 calories/gm. The caloric reduction is about one-third based upon a conventional butter cookie made from a formulation comprising flour, vegetable shortening, sugar, leavening, vanilla flavoring and cookie flavoring and texturizing ingredients.

EXAMPLE 15

The ingredients and their relative amounts, based upon the weight of the dough, used to prepare an oatmeal/raisin cookie of the crispy variety are:

| INGREDIENT | % |
| --- | --- |
| Flour | 16 |
| Vegetable Shortening | 8.5 |
| Sucrose | 14 |
| Polydextrose-N | 14.9 |
| Pregelatinized Wheat Starch | 6.18 |
| Microcrystalline Cellulose (Avicel RC-591) | 10.6 |
| Wheat Bran | 3 |
| Sodium Bicarbonate | 0.70 |
| Ammonium Bicarbonate | 0.60 |
| Diammonium Hydrogen Phosphate | 0.55 |
| Sodium Acid Pyrophosphate | 0.65 |
| Rolled Oat Flakes | 5.4 |
| Ground Raisins | 2.5 |
| Water | 14.2 |
| Emplex ® Emulsifier | 0.31 |
| Softex ® Emulsifier | 0.31 |
| Minor Flavoring Ingredients | 1.60 |
| | 100.0 |

The ingredients are combined as in Example 4. The dough is formed into pieces and baked as in Example 1 to obtain a final baked product having a moisture content of about 5.0% by weight. The pH of the final product, measured as in Example 1 is 7.2. The calorie content of the cookie, calculated using standard calorific values for the ingredients is about 3.1 calories/gm. The caloric reduction is about one-third based upon a conventional butter cookie made from a formulation comprising flour, vegetable shortening, sugar, leavening, oats, raisins and cookie flavoring and texturizing ingredients.

EXAMPLE 16

The ingredients and their relative amounts, based upon the weight of the dough, used to prepare a peanut butter cookie of the crispy variety are:

| INGREDIENT | % |
|---|---|
| Flour | 18.65 |
| Vegetable Shortening | 5.5 |
| Sucrose | 13 |
| Polydextrose-N | 15.7 |
| Potato Flakes | 2.5 |
| Pregelatinized Wheat Starch | 6 |
| Microcrystalline Cellulose | 10.46 |
| Sodium Bicarbonate | 0.70 |
| Ammonium Bicarbonate | 0.60 |
| Diammonium Hydrogen Phosphate | 0.55 |
| Sodium Aluminum Phosphate | 0.65 |
| Peanut Butter | 10 |
| Water | 13.8 |
| Emplex ® Emulsifier | 0.35 |
| Softex ® Emulsifier | 0.35 |
| Acesulfame-K | 0.04 |
| Minor Flavoring Ingredients | 1.15 |
| | 100.0 |

The ingredients are combined as in Example 3 to form a dough with the Emplex ® emulsifier being added with the Softex ® emulsifier. The acesulfame-K is dissolved in a portion of the water and is added in the creaming stage. The dough is formed into pieces and baked as in Example 1 to obtain a final baked product having a moisture content of about 5.7% by weight. The pH of the final product, measured as in Example 1 is 7.3. The calorie content of the cookie, calculated using standard calorific values for the ingredients is about 3.3 calories/gm. The caloric reduction is about one-third based upon a conventional butter cookie made from a formulation comprising flour, vegetable shortening, sugar, leavening, peanut butter and cookie flavoring and texturizing ingredients.

What is claimed is:

1. A cookie dough for producing reduced calorie cookies comprising
   a. from about 10% by weight to about 30% by weight flour,
   b. from about 0% by weight to about 15% by weight shortening or fat,
   c. from about 5% by weight to about 20% by weight of at least one sugar,
   d. from about 5% by weight to about 20% by weight of a water-soluble polydextrose,
   e. from about 0% by weight to about 10% by weight of at least one emulsifier,
   f. from about 0.50% by weight to about 3% by weight of a leavening system, said leavening system comprising (1) at least one salt selected from the group consisting of bicarbonate salts and carbonate salts, and (2) at least one acidifier which releases at least about 50% of the leavening gas during baking, and
   g. from about 4% by weight to about 15% by weight of a cellulosic bulking agent,
said percentages being based upon the weight of the cookie dough, the total amount of said shortening or fat (b) and said at least one emulsifier (e) being from about 6% by weight to about 15% by weight of said cookie dough, said dough upon baking producing a reduced calorie cookie having a pH of about 6.8 to about 9.0.

2. A cookie dough as claimed in claim 1 that is baked into a reduced calorie soft cookie having a pH of about 7 to about 7.4.

3. A cookie dough as claimed in claim 1 wherein the cellulosic bulking agent is at least about 75% by weight microcrystalline cellulose.

4. A cookie dough as claimed in claim 1 which comprises an edible alkaline agent in an amount sufficient to provide a pH in the baked cookie of about 7.9 to about 8.3.

5. A cookie dough as claimed in claim 3 which comprises an edible alkaline agent in an amount sufficient to provide a pH in the baked cookie of about 7.9 to about 8.3.

6. A cookie dough as claimed in claim 1 wherein the amount of said emulsifier is from about 0.25% by weight to about 3% by weight of said reduced calorie dough.

7. A cookie dough as claimed in claim 6 wherein said emulsifier is sodium stearoyl-2-lactylate.

8. A cookie dough as claimed in claim 6 wherein said at least one emulsifier comprises polyoxyethylene sorbitan fatty acid esters.

9. A cookie dough as claimed in claim 6 wherein said at least one emulsifier comprises a mixture of sorbitan monostearate and a polyoxyethylene sorbitan fatty acid ester and sodium stearoyl-2-lactylate.

10. A cookie dough as claimed in claim 9 wherein the ratio of said monostearate and said ester to said lactylate is from about 1:2 to about 2:1.

11. A cookie dough as claimed in claim 5 wherein said at least one emulsifier comprises sorbitan monostearate, a polyoxyethylene sorbitan fatty acid ester, and sodium stearoyl-2-lactylate in a total amount of from about 0.5% by weight to about 1% by weight of the dough.

12. A cookie dough as claimed in claim 11 wherein said fatty acid ester is polyoxyethylene(20)sorbitan monostearate.

13. A cookie dough as claimed in claim 1 wherein said leavening system comprises ammonium bicarbonate, diammonium hydrogen phosphate, sodium bicarbonate, and sodium acid pyrophosphate.

14. A cookie dough as claimed in claim 5 wherein said leavening system comprises from about 25% to about 35% ammonium bicarbonate, from about 15% to about 25% diammonium hydrogen phosphate, from about 25% to about 35% sodium bicarbonate, and from about 15% to about 25% sodium acid pyrophosphate, based upon the weight of the leavening system.

15. A cookie dough as claimed in claim 1 wherein said cellulosic bulking agent is alpha-cellulose, microcrystalline cellulose, or mixtures thereof.

16. A cookie dough as claimed in claim 1 further comprising at least one member seflected from the group consisting of water insoluble polydextroses and water insoluble polydextroses and water insoluble polymaltoses in an amount of less than 8% by weight, based upon the weight of the dough.

17. A cookie dough as claimed in claim 5 wherein the caloric content of cookies produced therefrom ranges from about 3 to about 4 calories per gram.

18. A cookie dough as claimed in claim 1 wherein said water-soluble polydextrose has a calorie content of less than or equal to about 1 calorie per gram.

19. A cookie dough as claimed in claim 2 wherein said leavening system comprises sodium bicarbonate and sodium aluminum phosphate, acidic.

20. A cookie dough as claimed in claim 19 wherein said at least one sugar comprises sucrose and high fructose corn syrup.

21. A cookie dough as claimed in claim 20 which comprises an edible alkaline agent in an amount sufficient to provide a pH in the baked cookie of from about 7 to about 7.4.

22. A cookie dough as claimed in claim 1 further comprising from about 2% by weight to about 15% by weight pregelatinized wheat starch, based upon the weight of the cookie dough.

23. A cookie dough as claimed in claim 1 wherein said cellulosic bulking agent is microcrystalline cellulose.

24. A cookie dough as claimed in claim 1 wherein the amount of flour is from about 18% by weight to about 24% by weight, the amount of the at least one sugar is from about 12% by weight to about 16% by weight, and the amount of the water-soluble polydextrose on a dry weight basis is from about 8% by weight to about 12% by weight, based upon the weight of the cookie dough.

25. A cookie dough as claimed in claim 1 which is a chocolate chip cookie dough.

26. Baked products prepared by shaping and baking the dough composition claimed in claim 1.

27. A method for producing a reduced calorie cookie comprising
   a. blending from 0% by weight to about 15% by weight shortening or fat, from about 5% by weight to about 20% by weight of at least on sugar, from about 5% by weight to about 20% by weight of a water-soluble polydextrose, and from 0% by weight to about 10% by weight of at least one emulsifier, and water to obtain a substantially homogeneous creamed mixture, the total amount of the shortening and emulsifier being from about 6% by weight to about 15% by weight,
   b. admixing from about 10% by weight to about 30% by weight flour, from about 4% by weight to about 15% by weight of a cellulosic bulking agent, and from about 0.5% by weight to about 3% by weight of a leavening system, said leavening system comprising (1) at least one salt selected from the group consisting of bicarbonate salts carbonate salts, and (2) at least one acidifier which releases at least about 50% of the leavening gas during baking, with said mixture of step (a) to obtain a substantially homogeneous dough,
   c. forming said dough into pieces, and
   d. baking said pieces to a moisture content of less than about 15% by weight,
to obtain cookies having a pH of about 6.8 to about 9.0, the percentages of the ingredients of steps a and b being based upon the weight of the dough.

28. A method as claimed in claim 27 wherein said water-soluble polydextrose is solubilized prior to blending.

29. A method as claimed in claim 28 wherein a polydextrose or polymaltose powder is preblended with ingredients of step (b) to obtain a substantially homogeneous dry blend and said dry blend is admixed with said mixture of step (a).

30. A method as claimed in claim 29 wherein the amount of said powder is from about 1% by weight to about 3% by weight of said dough.

31. A method as claimed in claim 28 wherein said cellulosic bulking agent is microcrystalline cellulose.

32. A method as claimed in claim 28 wherein said leavening system comprises ammonium bicarbonate, diammonium hydrogen phosphate, sodium bicarbonate, and sodium acid pyrophosphate.

33. A method as claimed in claim 28 wherein said leavening system comprises sodium bicarbonate and sodium aluminum phosphate, acidic.

34. A method as claimed in claim 28 wherein aspartame is applied to at least one surface of the baked pieces as an alcoholic solution or suspension.

35. A method as claimed in claim 28 wherein the creamed mixture of step (a) further comprises an edible alkaline agent.

36. A method as claimed in claim 35 wherein an aqueous solution of said alkaline agent is used to form said creamed mixture, the amount of the alkaline agent being sufficient to provide a pH in the baked cookie of about 7.9 to about 8.3.

37. A method as claimed in claim 28 wherein the ratio of said at least one salt to said at least one acidifier is from about 0.9:1 to about 2.4:1.

38. A method as claimed in claim 28 wherein the ratio of said at least one salt to said at least one acidifier is from about 0.5:1 to about 1.7:1.

39. A method as claimed in claim 32 wherein the ammonium bicarbonate and the diammonium hydrogen phosphate are admixed with the mixture of step (a) as aqueous solutions.

40. A cookie obtained by the process of claim 32.

41. A cookie dough composition for producing multi-textured reduced calorie cookies comprising a soft cookie dough which upon baking produces a soft cookie having a pH of about 7.0 to about 7.4, said soft cookie dough being enrobed in a cookie dough which upon baking produces crispier reduced calorie cookies having a pH of about 6.8 to about 9.0, each of said doughs comprising:
   a. from about 10% by weight to about 30% by weight flour,
   b. from about 0% by weight to about 15% by weight shortening or fat,
   c. from about 5% by weight to about 20% by weight of at least one sugar,
   d. from about 5% by weight to about 20% by weight of a water-soluble polydextrose,
   e. from about 0% by weight to about 10% by weight of at least one emulsifier,
   f. from about 0.50% by weight to about 3% by weight of a leavening system, said leavening system comprising (1) at least one salt selected from the group consisting of bicarbonate salts and carbonate salts, and (2) at least one acidifier which releases at least about 50% of the leavening gas during baking, and
   g. from about 4% by weight to about 15% by weight of a cellulosic bulking agent,
said percentages being based upon the weight of the cookie dough, the total amount of said shortening or fat (b) and said at least one emulsifier (e) being from about 6% by weight to about 15% by weight of said cookie dough.

42. A cookie dough composition for producing multitextured reduced calorie cookies as claimed in claim 41 wherein the leavening system of said cookie dough for producing crispier reduced calorie cookies comprises ammonium bicarbonate, diammonium hydrogen phosphate, sodium bicarbonate, and sodium acid pyrophosphate.

43. A cookie dough composition as claimed in claim 41 wherein said cookie dough for producing crispier reduced calorie cookies further comprises at least one member selected from the group consisting of water insoluble polydextroses and water insoluble polymaltoses in an amount of less than 8% by weight, based upon the weight of the dough.

44. A method of making reduced calorie multitextured cookies comprising baking the dough composition of claim 41.

45. Baked products having a moist soft interior and a crunchy exterior prepared by baking the dough of claim 41.

* * * * *